Nov. 30, 1954  L. E. W. MONTROSE-OSTER  2,695,586
MARINE CRAFT STABILIZING EQUIPMENT
Filed Oct. 28, 1949  3 Sheets-Sheet 1

Inventor
LOUIS E. W. MONTROSE-OSTER
By Blair & Blair
Attorneys

Nov. 30, 1954　　L. E. W. MONTROSE-OSTER　　2,695,586
MARINE CRAFT STABILIZING EQUIPMENT
Filed Oct. 28, 1949　　　　　　　　　　　　　　　3 Sheets-Sheet 2

Inventor
LOUIS E. W. MONTROSE-OSTER
By Blair & Black
Attorneys

Nov. 30, 1954    L. E. W. MONTROSE-OSTER    2,695,586
MARINE CRAFT STABILIZING EQUIPMENT
Filed Oct. 28, 1949    3 Sheets-Sheet 3

Inventor
Louis Eugene Widolt Montrose-Oster.
By
Boyle & Blair
Attorneys

United States Patent Office 2,695,586
Patented Nov. 30, 1954

2,695,586

MARINE CRAFT STABILIZING EQUIPMENT

Louis Eugene Widolt Montrose-Oster, Brussels-Boitsfort, Belgium, assignor to Pollopas Patents Limited, London, England, a British company Application October 28, 1949, Serial No. 124,152

Claims priority, application Great Britain November 2, 1948

8 Claims. (Cl. 114—124)

The present invention relates to ship stabilizing equipment and to an electric motor driving arrangement which is particularly suitable for driving the movable weight of a ship stabilizing equipment in which the weight is reciprocated back and forth to produce a stabilizing couple which counteracts the influencing factors which tend to cause the ship to roll.

An object of the invention is to provide an electric motor driving arrangement for mechanism which has to be repeatedly started and stopped, comprising two electric motors which are continuously rotated, the motors being so coupled between themselves that the output driving force or couple of the arrangement can be varied from zero to either a positive or negative maximum by simply varying the relative speeds of the two motors.

Another object of the invention is to provide an electric motor driving arrangement of which the driving shaft or member can execute a large torque right from the moment it begins to move from a stationary position, and which can accelerate at any desired rate to the desired maximum speed in either one direction or the other.

A further object of the invention is to provide an electric motor driving arrangement which permits current regeneration to be obtained during the whole period of deceleration or braking until the substantially stationary condition is reached. Hitherto, due to the fact that for regeneration, an electric motor must be driven at a higher speed than that at which it runs as a motor, regenerative braking has been restricted to applications such as mountain railways where the motor can be driven at the necessary generator speed for long periods of time whilst the vehicle is moving under the force of gravity. It cannot be practically used during slowing down up to the point of stopping since as soon as the generator speed falls below that necessary for generation, no current is fed back into the supply network. With the arrangement according to this invention regeneration takes place substantially right up to the time when the driving shaft or member becomes stationary.

Another object of the invention is to provide a stabilizing or anti-rolling equipment for ships and other vehicles of the type employing a movable weight, of which the total weight of the entire equipment is reduced to a minimum. It is also an object of the invention to provide a stabilizing equipment which requires a minimum of space in the ship, and this at the least valuable part of the ship, and which also consumes a minimum of electric power for its operation.

A still further object of the invention is to provide a stabilizing equipment of the movable weight type, wherein a sudden change in the instantaneous value of the influencing factors (sea couple) on the vessel, causes a sudden variation in the rate of acceleration of the movable mass to produce a reaction on the vessel which at least partly counteracts the influence of said sudden change of said instantaneous value.

These and the other objects of the present invention will be more clearly understood from the following description in conjunction with the figures of the accompanying drawings which show, by way of example, a stabilizing or anti-rolling equipment for a ship. In the drawings.

Figure 1:
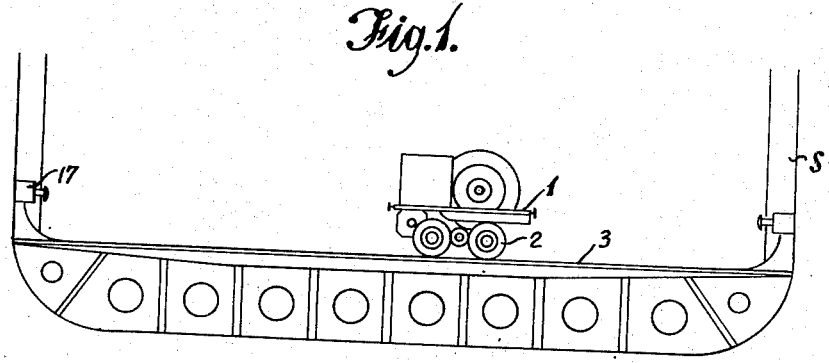
Fig. 1 is a sectional view of the arrangement of the stabilizing equipment within a ship.

In order to impede the rolling of a ship it suffices, in general, to be able to create on board the ship, at any instant, a couple which is equal and opposite to that exerted on the ship by the sea. It is also necessary to maintain the ship vertical. It is a function of the control system to regulate these conditions.

An ideal anti-rolling apparatus must combine the features of high efficiency and great flexibility; it must be of small weight and size and suitable for installation in the least valuable part of the ship, for example at the bottom of the hold; it must be able to function both when the ship is moving or stationary; have a moderate initial cost and be economical to operate. No known system would appear to fulfill all these conditions.

Considering a liner with a displacement D of about 40,000 tonnes, a metacentric height H of about 1 meter, a breadth of about 30 meters, and a natural period of about 28 seconds. The maximum sea couple, assuming that sin $i=0.05$ where the angle $i$ of the wave slope to the horizontal equals 3°, will be $D \times H \times \sin i = 40,000 \times 1 \times 0.05 = 2,000$ Tm. (Tonne meters). The waves having a trochoidal form, the mean couple can be evaluated as 0.62 of the maximum couple, that is 1240 Tm. The anti-rolling apparatus must be able to produce, at any instant, a maximum couple of 1240 Tm. in either direction, passing through zero.

Stabilization systems based on the displacement of a solid weight, as hitherto proposed, in which a truck is disposed approximately level with the centre of gravity and is capable of being displaced transversely with reference to the direction of travel of the ship by a system of cables which pass over two return members fixed to the port and starboard sides and are operated by a motor fixed to the frame of the ship, compare favourably with systems employing liquid weights. It will be seen that a system of the first-mentioned kind functions as a lift disposed horizontally. The advantages of this system are: great simplicity; a low weight, about 150 tonnes for the liner in question; it can operate either when the ship is stationary or travelling; ability to create or suppress a static list without expenditure of energy; and small space requirement. But it still has the following quite serious disadvantages; high power consumption, largely due to low efficiency; insufficient flexibility; very large strain on cables and hull; and occupation of valuable space.

The present invention overcomes all these disadvantages whilst adding to the existing advantages. It is based on the following considerations:

(A) Since, for the liner in question, a weight of 100 tonnes, judiciously placed and displaced, can be made to create the necessary stabilization couple, it is advantageous to discard all systems which involve an installation of substantially greater weight. It is thus necessary to limit as much as possible the weight of the fixed installation, the electric generators included. To this end it is necessary to choose a form of realisation having not only a very high efficiency but which also enables recovering or regenerating, during the period of deceleration, of a part of the energy expended during the period of acceleration; this will diminish both the power and the weight of the generator. There must also be no strain on the hull to the point of requiring its reinforcement.

(B) The stabilizer must occupy as small a space as possible and at a place where its presence is least inconvenient.

(C) The stabilizer must be very flexible in operation. It must be able therefore, despite the inertia of its considerable mass, to create large correcting couples in an instantaneous manner.

(D) The construction of the apparatus and its method of operation must be simple.

(E) The stabilizer must be safe in operation under all conditions.

(F) The initial cost of the installation must be as low as possible.

These desiderata are achieved in the stabilizing system to be described by constructing the movable weight in the form of a wheeled truck which carries the driving motors, converter group, and other electrical apparatus whereby the motors and electrical equipment form part of the movable mass and the weight of the fixed installation comprising the control apparatus, can be reduced to a minimum. The truck is arranged to be moved on rails arranged transversely of the ship, the motors driving the truck wheels or toothed wheels engaging with racks or the like, or both the truck wheels and toothed wheels.

The stabilizing system is so designed that the power required for its actuation can be derived from the existing power plant of the ship or vehicle without the necessity of providing a supplementary power plant specifically for driving the stabilizing equipment. This again reduces the weight of the fixed installation and also reduces the space requirement to a minimum.

In the arrangement according to the invention the electric traction motors carried on and forming part of the movable weight are so arranged that during the period of deceleration of the weight regenerative braking is employed to recover a part of the electrical energy expended during the period of acceleration of the weight.

A still further feature of the invention consists in so displacing the movable weight with respect to the centre of gravity of the vessel that the reaction created on the rails or rack by a sudden acceleration or deceleration of the truck produces a stabilizing effect.

The embodiment of the invention which will now be described by way of example is suitable for a liner of the size above referred to.

At the bottom of the hold of the ship S is provided a space of about 10 meters long by 4 meters high extending across the breadth of a ship, that is 30 meters, which gives a volume of 1,200 cubic meters. Rails 3, and preferably racks 8 or the equivalent, are mounted transversely with reference to the direction of travel of the ship and positioned as far as possible below the centre of gravity. These fixed parts of the device will be installed, according to circumstances, either on a plane surface or on a curved surface of which the curvature is determined with the object of permitting the truck to be displaced on a plane as similar as possible to the true horizontal plane; this is for the purpose of reducing to a minimum the effect of the vertical component.

The truck 1 is mounted on flanged wheels 2, preferably of the double flanged type. Its weight mainly consists of its traction motors and accessories, and of one or more converter groups (with or without flywheels) serving for the feeding of the traction motors. These motors displace the truck, exactly as if it were an electric locomotive, by transmitting a couple either to the running wheels 2 or to toothed wheels engaging with one or more racks 8 or the like, or to both the running and toothed wheels.

Figure 2:
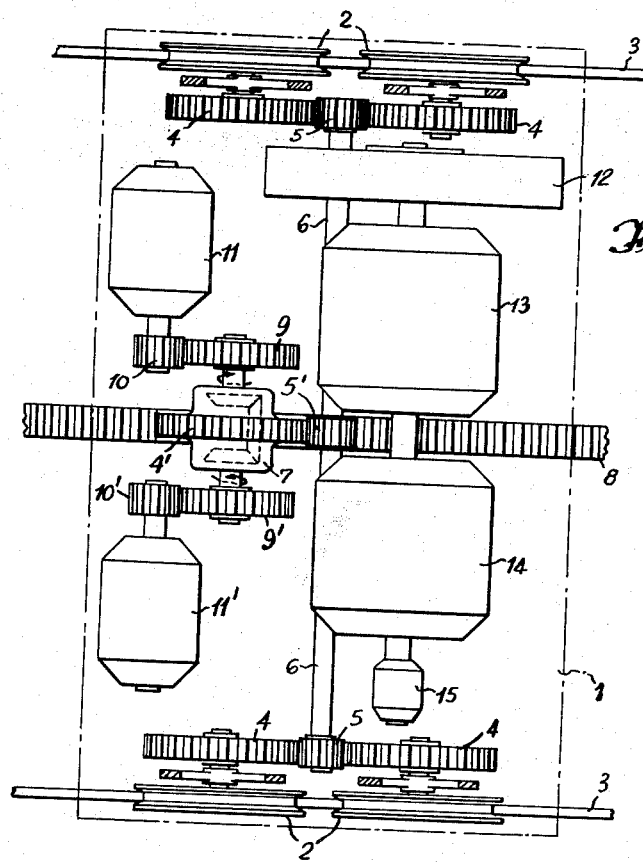
Fig. 2 is a plan view of the truck.
Figure 3:
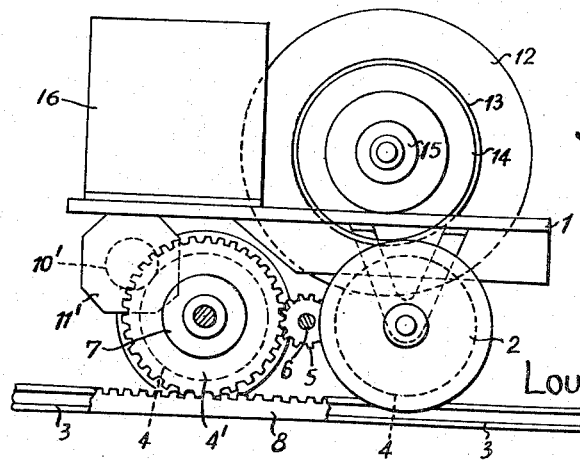
Fig. 3 is an end view of Fig. 2.

The construction of the truck is more clearly illustrated, diagrammatically, in Figs. 2 and 3. The chassis 1 is mounted on the flanged driving wheels 2. Fixed to each wheel is a toothed wheel 4, which toothed wheels are interconnected together by the pinions 5 which also serve for driving the wheels. The pinions 5 at opposite ends of the truck are mounted on a common shaft 6 which at its centre carries a third pinion 5′, identical with the pinions 5, which meshes with a toothed wheel 4′, which is identical with the toothed wheel 4 and is fixed to the cage 7 of a differential. This toothed wheel 4′ meshes with the rack 8 which is fixed to a constructional element of the hull of the ship.

Slung from the underside of the chaissis 1 (which chassis is illustrated in Fig. 2 only as a dotted rectangle in order that this figure may also show the components below the chassis as well as those above) are two direct current traction motors 11, 11′, which rotate in opposite directions, the shafts of these two motors driving, through the reduction gears 10, 9 and 10′, 9′ respectively, the two free shafts of the differential. As a result of the traction motors 11, 11′ rotating in opposite directions, as indicated by the arrows, the cage 7 and the toothed wheel 4′ fixed to it remain stationary as long as the two motors turn at the same speed. When one of the motors turns more quickly than the other the cage 7 of the differential executes an angular movement and transmits a couple by means of the toothed wheel 4′ to the rack 8 which causes the truck to be displaced. The direction of displacement will depend upon whether the motor 11 is being driven more quickly than motor 11′ or vice versa. Equilibrium is established according to the laws which are valid for all differentials, and it follows that the cage of the differential can also transmit a generating couple as well as a driving couple. Thus, it becomes possible to obtain regenerative braking. In other words, during the period of deceleration, the energy expended during acceleration is recovered, less the losses of the motors and the different transmission members. Furthermore, with the arrangement described, this regenerative braking is obtained during the whole period of deceleration and right up to the time when the truck completely stops and without disengaging the motors.

In order to avoid surges on the electrical power plant of the ship, the two traction motors are fed through a converter group of the Ward-Leonard-Ilgner type which is also mounted on the truck and fed for example by means of current collectors of a known type. This converter group is illustrated in Figs. 2 and 3 as comprising a flywheel 12, a direct current dynamo 13, a direct current or alternating current motor 14 fed from the power plant of the ship, and an exciter 15. The casing 16 also carried on the truck (this casing is omitted from Fig. 2 in order to show the arrangement of the motors and differential) contains the regulator of the control apparatus which is described in co-pending application Serial No. 124,151, filed October 28, 1949.

As above mentioned, the two direct current traction motors are continuously rotated in opposite directions. When they are rotating at identical speeds, the cage 7 of the differential is not rotating and the truck is stationary. In order to start the truck in motion, it suffices to accelerate one motor and to decelerate the other, which can be easily effected by diminishing the excitation of one and increasing the excitation of the other. The latter will then turn as a generator and restores current to the supply network. This means that the motors must furnish a power of approximately double that which would normally be required for shifting the truck, of which one half is used for the acceleration of the truck and the other half for driving the second machine which will restore this power to the line.

When the truck is stationary the excitation of the two machines is equalized. If it is a question of braking very rapidly and/or of reversing the direction of movement, the excitation of the first machine is rapidly increased and that of the second machine is consequently reduced.

Figure 4:
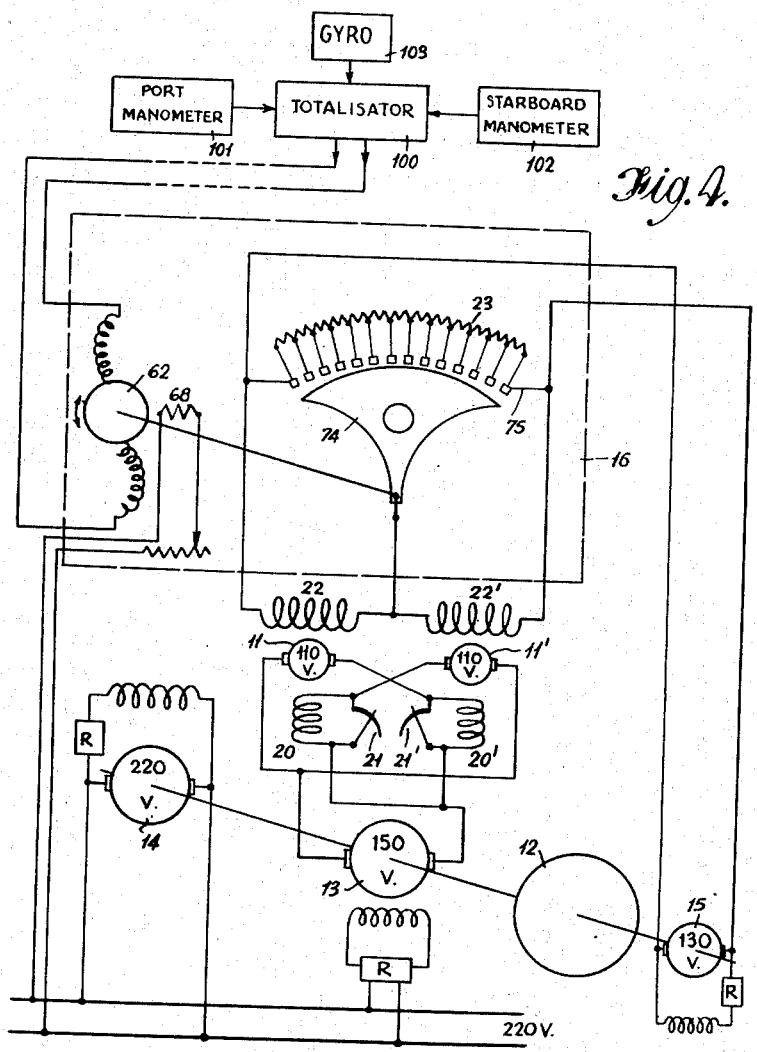
Fig. 4 is a circuit diagram of one arrangement for controlling the speed of the traction motors.

One method of controlling the excitation of the two motors in response to the operation of the control apparatus is illustrated in Figure 4 in which the two traction motors 11, 11′ are indicated as compound wound motors; each series winding 20, 20′ is preferably traversed by the current passing through the armature of the other machine. Each series winding is shunted by a resistance 21, 21′ which permits adjusting, at will, the influence of this series winding from zero to a maximum. Thus, according to the setting of the resistances 21, 21′, each machine can have a shunt characteristic or a variable compound characteristic.

The angular speed of each machine is controlled by a rheostat connected in the circuit of its field winding. In the embodiment illustrated in Figure 4, the field windings 22, 22′ of the two motors are controlled by a potentiometer 23 provided with a number of tapping contacts 75 over which a contact sector 74 may be moved to produce simultaneously an increase in the excitation of one machine whilst diminishing that of the other machine. In this way the speed of the first machine is decreased and that of the second machine is increased.

The two motors are fed through a converter group comprising the motor 14 fed from the 220-volt supply from the power plant of the ship. The motor 14 drives the dynamo 13 which supplies current to the motor armatures and series windings, and also drives the exciter 15 for supplying current to the field windings 22, 22′. The flywheel 12 is also mounted on the motor shaft. In the example illustrated, the dynamo 13 generates a direct current of 150 volts and the exciter 15 generates a direct current of 130 volts. The current for driving the motor 14 may be picked up from the electrical network of the ship through any suitable collector.

The sector 74 associated with the potentiometer 23 is moved by a regulator constituted by a moving coil instrument 62 influenced by an exciter winding 68. The regulator 62 is caused to execute movements in one direction or the other in accordance with the output from control apparatus responsive to the influencing factors (sea couple). This control apparatus may, as above mentioned, be constructed as described in copending Application Serial No. 124,151 filed October 28, 1949, the regulator 62, its exciter winding 68 and the sector 74 and associated contacts 75 bearing the same reference numerals as the drawings accompanying that application. The tottalisator described in that application is diagrammatically illustrated in Figure 4 hereof by the block 100. The totalisator described in that application is diagramport and starboard manometers 101 and 102 and of the gyro 103 as more fully described in that application. The regulator 62 and the sector 74 and associated potentiometer are mounted on the moving truck and located in the casing 16 thereon, the regulator 62 being connected to the output from the totalisator by any convenient current collector means which does not interfere with the movement of the truck.

Referring again to Fig. 1, the truck executes movements along the length of the rails, from one side to the other, under the control of the regulator operated by the control equipment responsive to the factors influencing the rolling of the ship. The distance by which the truck is displaced from its central position depends upon the stabilizing couple which it has to produce and the arrangement is designed so that the maximum couple required (1240 Tm. obtained when the truck is displaced 12.4 meters from the centre of the ship) is obtained whilst the truck is still spaced from the end of its track. If, for any reason, the truck reaches the end of the track it will touch a kind of buffer 17. In moving this buffer it will operate the control mechanism in a manner to render it inactive until the control operates to move the truck towards the opposite side. It will be understood that the truck will be provided with powerful brakes in order to prevent its movement in the event of a failure in the electrical or mechanical equipment. Such braking equipment is already known and will therefore not be described in the present application. Various safety devices may also be provided to make derailment impossible and to hold the truck fixed to the ship when it is out of operation.

The advantages of the stabilizing arrangement described will be evident. The strain on the hull is negligible. Furthermore, since the rails, in the case of the liner under consideration, are arranged at about 10 metres below the centre of gravity, it is possible to use, for purposes of stabilization, not only the weight itself but also the reaction on the hull (via the rails and racks or the like) resulting from the speed and the acceleration of the truck. This fact produces some very interesting results which will be more fully explained later.

The effort necessary for the horizontal displacement of the truck is only of the order of 2 kg./T., that is 200 kilograms in the case of the 100-tonne weight being considered. For an assumed maximum speed of 4 m./sec., the power required is:

$$\frac{200 \times 4 \times 3.6}{270 \times 0.8} = \frac{10.5}{0.8} = 13 \text{ H. P.}$$

taking into account an efficiency of 0.8 of the reduction gears but without taking account of a possible vertical component.

The natural period of a liner of the size in question would be about 28 seconds, but if, in emergency, the weight has to be displaced from one side of the ship to the other in 8 seconds, that is in about half the normal time, it would be necessary for example that during two seconds it should have an acceleration of 2 m./sec.$^2$. The tractive effort necessary for this acceleration amounts to:

$$\frac{100,000}{g.} \times 2 = \text{about } 20,000 \text{ kg.}$$

It is to be noted that there exists, moreover, a reaction on the rails and racks or the like corresponding to this effort. This produces a couple of $20 \times 10 = 200$ Tm. absolutely instantaneously ($=\frac{1}{6}$ of the maximum static couple) which, in most cases, will be more than sufficient to neutralize the sea couple. From this it results that, when the mass and the value of its acceleration have been carefully chosen, the truck will only be displaced relatively slightly.

In order to obtain an acceleration of 2 m./sec.$^2$ during two seconds, it is necessary to provide a power of $$\frac{20,000 \times 14.4}{270 \times 0.8} = 1,300 \text{ H. P.}$$

which is not a prohibitive value, and so much the less so since it is possible to recover or regenerate quite a large fraction thereof during the period of deceleration.

Although the functioning of the system is very simple, it however requires two motors each of which theoretically has to be twice (in practice this factor is less than twice) as powerful as the single motor that would be employed in a normal traction arrangement. But this is only of secondary importance since the motors form an integral part of the truck and of its 100 tonnes to be displaced. Furthermore, since both motors are continuously rotating and the starting, stopping and reversing of the truck is effected by simply varying the relative speeds of the two motors, no difficulties are encountered as would be experienced if the motors themselves had to be stopped and started, and it is possible to apply a large torque instantaneously upon starting the truck and consequently very rapid accelerations and decelerations, or instantaneous changes of acceleration or deceleration, by the simple adjustment of the position of the sector 74 of the potentiometer 23. In order to obtain this large torque, the reduction gears between the motors and the free ends of the differential are essential.

When the displacement of the truck from one side of the ship to the other takes place in a minimum of 8 seconds, 2 seconds may be employed for acceleration, 4 seconds for travelling at constant speed (4 m./sec.) and 2 seconds for deceleration.

Neglecting losses, the period of deceleration permits of recovering or regenerating the energy furnished during the period of acceleration in a manner that, theoretically, it would only be necessary to furnish the energy required for the displacement at constant speed.

It will be supposed, assuming worst conditions, that there is no regeneration. In this limiting case which supposes an ordinary braking during the two last seconds, there will thus be used, during 2 seconds a power of 1300 H. P., during 4 seconds a power of 13 H. P., and nothing during the last 2 seconds, which gives a mean of $$\frac{(2 \times 1300) + (4 \times 13)}{8} = \frac{2652}{8} = 332 \text{ H. P.}$$

during eight seconds.

The motor of the converter group must thus be capable of furnishing this power constantly, if one considers the most unfavourable case, or about 665 H. P. taking into account an overall efficiency of 50% of all the units involved.

In the greater number of cases, the displacement of the truck, and even not always its maximum displacement, will take place at the natural period of the ship, that is in 28/2 seconds, which reduces the power to be furnished by the motor of the group to $$\frac{665 \times 8}{14} = \text{about } 380 \text{ H. P.}$$

always without taking into account regeneration but equally without taking into account the influence of a possible vertical component.

It follows from the above that it is possible, by means of a constant power of about 400 H. P. and probably even less, to effect the stabilization of a liner of 40,000 tonnes displacement by means of an installation weighing only about 110 tonnes and requiring, at the bottom of the hold, a space of 1200 cubic meters.

Compared with the powers absorbed in other installations on board the liner, this power is insignificant to the point that the normal power plant can furnish the power required without it being necessary to provide a supplementary generator unit.

The power required for displacing the truck through its maximum distance in the normal half period of 14 seconds, in order to compensate for the maximum rolling of the ship, will be as follows. In this case the truck will travel in 14 seconds from one extremity of its movement to the other. After having accelerated, during about 6 seconds, at a rate of 0.5 m./sec.² it will travel at a maximum constant speed of 3 m./sec. during about 2 seconds, this being followed by deceleration during 6 seconds at the same rate of 0.5 m./sec.² The truck thus travels 9 metres in 6 seconds, then 6 metres in 2 seconds, then a further 9 metres in 6 seconds, that is 24 metres in all in 14 seconds. The tractive effort necessary for this acceleration is $$\frac{100,000}{g.} \times 0.5 = \text{about } 5,000 \text{ Kg.}$$

The power for the acceleration is $$\frac{5,000 \times 10.8}{270 \times 0.8} = \text{about } 250 \text{ H. P.}$$

Assuming again that there is no regeneration, then the power of 250 H. P. will be required during 6 seconds and that of 13 H. P. during 2 seconds, so that the mean power furnished by the network or converter group will be $$\frac{(6 \times 250)(2 \times 13)}{14} = 109 \text{ H. P.}$$

In estimating the overall efficiency of all the units involved at 50%, as previously, the power to be provided will only be of the order of about 220 H. P. This value represents about the maximum power normally consumed. It will diminish correspondingly as the distance traversed by the truck decreases.

Figure 5:
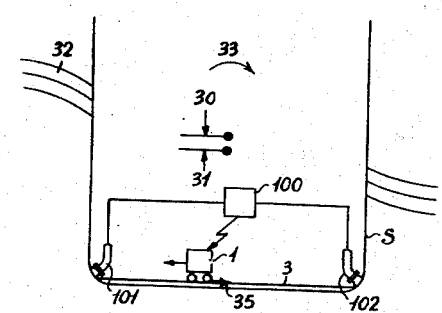
Fig. 5 is a diagram for explaining the stabilizing effect of the reaction of the truck upon its rails.

The effect of the reaction of the movement or acceleration of the truck upon the rails will be described with reference to Fig. 5 which shows a section of a ship. The distance between the two arrow heads 30, 31 indicates the metacentric height of the vessel. The ship, as indicated, is in the vertical position, due to the position of the truck 1. If, at this moment a large wave 32 arrives on the port side and tends to roll the ship in the clockwise direction, as indicated by the arrow 33, the control mechanism will suddenly accelerate the truck. The displacement of the truck towards the port side creates a couple opposing that exerted by the sea. The reaction to its sudden acceleration, which is exerted via the rails and the rack on the bottom of the ship, as indicated by the arrow 35, creates an additional powerful couple which is also opposed to the sea couple. This couple has a maximum value by reason of its force being applied as far as possible below the centre of gravity of the ship. It will be understood that such an accelerating force can only usefully act during a fraction of a second, exactly like the sea couple which, in the opinion of the experts acts only for a short instant when it is a question of the crest of an isolated wave. Thus by causing this sudden acceleration to occur only during a fraction of a second, the desired compensating reaction is produced without, however, substantially increasing the speed or normal acceleration of the truck, nor its normal displacement.

In the case of a regular oscillatory movement, for example of rolling, the second derivative of motion, namely acceleration, is displaced by 180° with reference to the rolling itself. It follows that, in the case of a truck executing oscillatory movements, the reaction resulting from the normal and regular accelerations and decelerations of the truck at the ends of movement create a couple opposed to that constituted by the weight of the truck, that is opposed to that required for stabilization. This couple amounts, in the normal case to 5000×10= 50 Tm., that is to 1/24 of the static couple. For this reason it is desirable to reduce the normal rate of acceleration and deceleration of the truck as much as possible. A sudden acceleration, however, whilst the truck is moving, and whether in the positive or negative direction, consequent upon a sudden change in the instantaneous value of the sea couple, will produce a reaction in the direction which compensates for the sudden change in the sea couple and assists in the stabilization.

For example, a large instantaneous reaction may be produced by an acceleration of 10 m./sec.². It suffices to let this act during only 1/10 of a second in order to produce a reaction of 100 tonnes, or a couple of 1000 Tm. by means of a power of $$\frac{100,000 \times 10 \times 3.6}{g. \times 270 \times 0.8} = 1620 \text{ H. P.}$$

On the other hand, at the end of the period of acceleration 1/10 of a second, the truck will have been displaced by only 0.05 meter.

Reviewing the requirements enumerated on the first page, the following advantages of the apparatus according to this invention will be noted: moderate cost of initial installation; minimum operating costs; an insignificant weight which is in all cases below 1% of the displacement of the ship, and is of the order of 0.3% in the case of the liner considered; very reduced space requirement at the least valuable part of the ship; very high efficiency and very great flexibility; operation irerspective of whether the ship is travelling or stationary; and the possibility of creating or neutralising a static list without expenditude of energy. In brief, the anti-rolling apparatus according to this invention satisfies all the postulated conditions.

Although particular embodiments according to the invention have been described, it will be understood that various modifications may be made without departing from the scope of the invention. Furthermore, although the invention has been described with particular reference to its application to the stabilization of ships, it can also be applied to the stabilization of floating vessels in general, and the expression "marine craft" when used herein is intended to include all floating vessels.

I claim:

1. In a stabilizing equipment for marine craft, a track arranged below the centre of gravity of the craft and close to the bottom of the hull of the craft and transversely thereto, a movable weight comprising a truck having wheels running on said track, said truck carrying at least one motor for driving the wheels of said truck, control means for measuring the instantaneous wave action and means for actuating said motor in response to the measurement of said control means to move the truck back and forth on the track, a reduction gear included in the drive between the motor and the wheels producing such reduction that the motor applies a powerful torque to the wheels, and track engaging means coupling the wheels to the track for applying a corresponding powerful effort to the track whereby to enable a sudden acceleration of the truck upon a sudden change of the instantaneous value of the wave action to create a reaction on the track and the craft.

2. Equipment as claimed in claim 1, wherein the track engaging means includes a rack and the truck includes a toothed wheel meshing with said rack, said toothed wheel being connected to the reduction gear driven by the motor.

3. In a stabilizing equipment for marine craft, a track arranged below the centre of gravity of the craft and close to the bottom of the hull of the craft and transversely thereto, a movable weight comprising a truck running on said track, said truck carrying two electric motors of which at least one is a variable speed motor, a differential having two input members and an output member, a reduction gear coupling the shaft of one of said motors to one of said input members, a second reduction gear coupling the shaft of the other of said motors to said other input member, means for supplying electric current to the two motors to drive them at such speeds and in such directions that said output member of the differential remains stationary, a regulator for varying the electric current to said at least one variable speed motor to vary the speed thereof relative to the other motor and thereby cause said output member to move, control means for measuring the instantaneous wave action, means for actuating said regulator in response to the operation of said control means, and means for driving the truck back and forth on the track by the movement of said output member.

4. In a stabilizing equipment for marine craft, a track arranged transversely of the craft, a movable weight comprising a truck running on said track, said truck carrying two direct current electric motors and a differential having two input members and an output member, said motors driving respectively through reduction gearing the two input members of said differential, means for supplying electric current to said electric motors so that they rotate in opposite directions at the same speed, a toothed wheel driven by the output member of the differential and engaging with a rack fixed to the craft, and means for simultaneously varying the excitation of said motors in opposite directions, said means for supplying electric current to said motors including an electrical converter group carried by said truck.

5. In a stabilizing equipment for marine craft, a track arranged below the centre of gravity of the craft and close to the bottom of the hull of the craft and transversely thereto, a movable weight comprising a truck having wheels running on said track, said truck carrying two direct current dynamo-electric machines each capable of operating both as a current generator and a motor, and a differential having two input members and an output member, said machines being coupled respectively through reduction gearing to the two input members of said differential, means for driving the wheels of said truck by the movement of the output member of said differential, means for supplying electric current to said machines so that they rotate as motors in such directions and at such speeds that said output member remains stationary, a regulator for simultaneously varying in opposite directions the electric current in said machines, said machines alternatively operating one as a motor consuming current and the other as a generator generating current and constituting a rapidly-acting regenerative braking device with a cushioning action, control means for measuring the instantaneous wave action, and means for actuating said regulator in response to the operation of said control means.

6. In a stabilizing equipment for marine craft, a track arranged below the centre of gravity of the craft and close to the bottom of the hull of the craft and transversely thereto, a movable weight comprising a truck having wheels running on said track, said truck carrying two direct current electric motors, a differential having two input members and an output member, said motors driving respectively through reduction gearing the two input members of said differential, coupling means for driving the truck wheels by the movement of the output member of said differential, an electric supply source, circuit connections for supplying current from said source to said motors for energising said electric motors so that they rotate in opposite directions at equal speeds, a regulator in said circuit connections for varying the excitation of said motors in opposite directions, control means for measuring the instantaneous wave action, and means for actuating said regulator in response to the operation of said control means and thereby to move the truck back and forth on the track, said truck carrying an electrical converter group which is fed by the electric supply source and in turn supplies current to the electric motors.

7. In a stabilizing equipment for marine craft, a track arranged below the centre of gravity of the craft and close to the bottom of the hull of the craft and transversely thereto, a movable weight comprising a truck having wheels running on said track, said truck carrying two direct current electric motors and a differential having two input members and an output member, said motors driving respectively through reduction gearing the two input members of said differential, a toothed wheel driven by the movement of the output member of said differential and engaging with a rack fixed to the craft and extending substantially parallel to the track, an electric supply source, circuit connections for supplying current from said source to said motors, for energising said electric motors so that they rotate in opposite directions at equal speeds, a regulator in said circuit connections for simultaneously varying the excitation of said motors, buffer members at opposite ends of said track and adapted to be engaged respectively by said truck when it reaches the corresponding end of said track, control means for measuring the instantaneous wave action, and means for actuating said regulator in response to the operation of said control means to move the truck back and forth on the track.

8. In a stabilizing equipment for marine craft, a track arranged below the centre of gravity of the craft and close to the bottom of the hull of the craft and transversely thereto, a rack adjacent the track and fixed to the craft, a movable weight comprising a truck having wheels running on said track, said truck carrying two direct current electric motors and a differential having two input members and an output member, said motors driving respectively through reduction gearing the two input members of said differential, a toothed wheel driven by the movement of the output member of said differential and engaging with said rack, an electric supply source, circuit connections for supplying current from said source to said motors, for energising said electric motors so that they rotate in opposite directions at equal speeds, a regulator in said circuit connections for varying the electric current supplied to said motors, control means for measuring the instantaneous wave action, and means for actuating said regulator in response to the operation of said control means and thereby to move the truck back and forth on the track, said differential, reduction gears and motors coacting to provide sudden acceleration and deceleration of the truck with respect to the track.

References Cited in the file of this patent

UNITED STATES PATENTS

| Number | Name | Date |
|---|---|---|
| 652,243 | Brown | June 26, 1900 |
| 942,198 | Dey | Dec. 7, 1909 |
| 1,108,422 | Barnum | Aug. 25, 1914 |
| 1,130,054 | Barnum | Mar. 2, 1915 |
| 1,235,132 | Gaylord et al. | July 31, 1917 |
| 1,343,630 | Locarni | June 15, 1920 |
| 1,593,343 | Merrill | July 20, 1926 |
| 1,708,679 | Norden | Apr. 9, 1929 |
| 1,730,941 | Myers | Oct. 8, 1929 |
| 1,731,879 | Thompson | Oct. 15, 1929 |
| 1,853,069 | Minorsky | Apr. 12, 1932 |
| 2,130,929 | Rocard | Sept. 20, 1938 |

FOREIGN PATENTS

| Number | Country | Date |
|---|---|---|
| 356,516 | Germany | July 21, 1922 |